United States Patent
Devdas et al.

(10) Patent No.: US 9,537,784 B2
(45) Date of Patent: Jan. 3, 2017

(54) NETWORK-SPECIFIC DATA DOWNLOADING TO A MOBILE DEVICE

(71) Applicant: INTERNATIONAL BUSINESS MACHINES CORPORATION, Armonk, NY (US)

(72) Inventors: Bharat Devdas, Bangalore (IN); Girish Dhanakshirur, Bangalore (IN); Srihari Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 14/297,168

(22) Filed: Jun. 5, 2014

(65) Prior Publication Data

US 2015/0358388 A1 Dec. 10, 2015

(51) Int. Cl.
 - *G06F 15/16* (2006.01)
 - *H04L 12/805* (2013.01)
 - *H04L 29/08* (2006.01)
 - *H04L 29/06* (2006.01)
 - *H04L 12/801* (2013.01)

(52) U.S. Cl.
CPC ............ *H04L 47/365* (2013.01); *H04L 47/14* (2013.01); *H04L 67/06* (2013.01); *H04L 67/1095* (2013.01); *H04L 69/04* (2013.01)

(58) Field of Classification Search
CPC ......... H04L 47/365; H04L 67/06; H04L 69/04
USPC ....................................... 709/217, 219, 235
See application file for complete search history.

(56) References Cited

U.S. PATENT DOCUMENTS

| 8,274,927 B2 | 9/2012 | Kim et al. |
| 9,124,650 B2 * | 9/2015 | Maharajh |
| 2003/0229441 A1 * | 12/2003 | Pechatnikov ......... G01C 21/26 701/411 |
| 2010/0124196 A1 * | 5/2010 | Bonar .................. H04B 7/0689 370/329 |
| 2012/0140651 A1 | 6/2012 | Nicoara et al. |
| 2013/0083649 A1 | 4/2013 | Denny et al. |
| 2014/0036705 A1 | 2/2014 | Ma |

OTHER PUBLICATIONS

G.P. Perrucci, "On the Impact of 2G and 3G Network Usage for Mobile Phones' Battery Life", European Wireless Conference, 2009, pp. 255-259.
Anonymous, "Context and User Behavior Driven Adaptive Switching Between WLAN and Cellular Network", ip.com, Disclosure No. IPCOM000231008D, Sep. 22, 2013, pp. 1-3.
List of IBM Patents or Patent Application Treated as Related—Apr. 16, 2015, pp. 1-2.

* cited by examiner

*Primary Examiner* — Kristie Shingles
(74) *Attorney, Agent, or Firm* — Law Office of Jim Boice

(57) ABSTRACT

A method, system, and/or computer program product downloads a blob of data onto a mobile device. A blob of data that is to be downloaded from a server to a mobile device via a particular network is identified. A first maximum chunk size for the first network for the particular network is identified, as is a timeout value for the mobile device when downloading a chunk of data. An optimal chunk size for chunking the blob of data is determined based on the timeout value of the mobile device and the maximum chunk size for the first network. The blob of data is partitioned into chunks of data based on the first optimal chunk size, and the chunks of data are transmitted from the server to the mobile device.

19 Claims, 4 Drawing Sheets

NETWORK-SPECIFIC DATA DOWNLOADING TO A MOBILE DEVICE

BACKGROUND

The present disclosure relates to the field of computers, and specifically to the use of computers on a network. Still more particularly, the present disclosure relates to downloading data from a server to a mobile device over a network.

A mobile device is a hardware unit that is able to communicate via a network. An exemplary mobile device is a cell phone, such as a smart phone that is able to execute applications, either remotely or locally, and/or to communicate voice and data over a network, such as a cellular phone network. One example of data communication is to download a blob of data from a server. A "blob", which is an acronym for a "binary/basic large object", is a collection of binary data, which often is stored as a single entity in a database.

SUMMARY

A method, system, and/or computer program product downloads a blob of data onto a mobile device. A blob of data that is to be downloaded from a server to a mobile device via a particular network is identified. A first maximum chunk size for the first network for the particular network is identified, as is a timeout value for the mobile device when downloading a chunk of data. An optimal chunk size for chunking the blob of data is determined based on the timeout value of the mobile device and the maximum chunk size for the first network. The blob of data is partitioned into chunks of data based on the first optimal chunk size, and the chunks of data are transmitted from the server to the mobile device.

DETAILED DESCRIPTION

Figure 1:
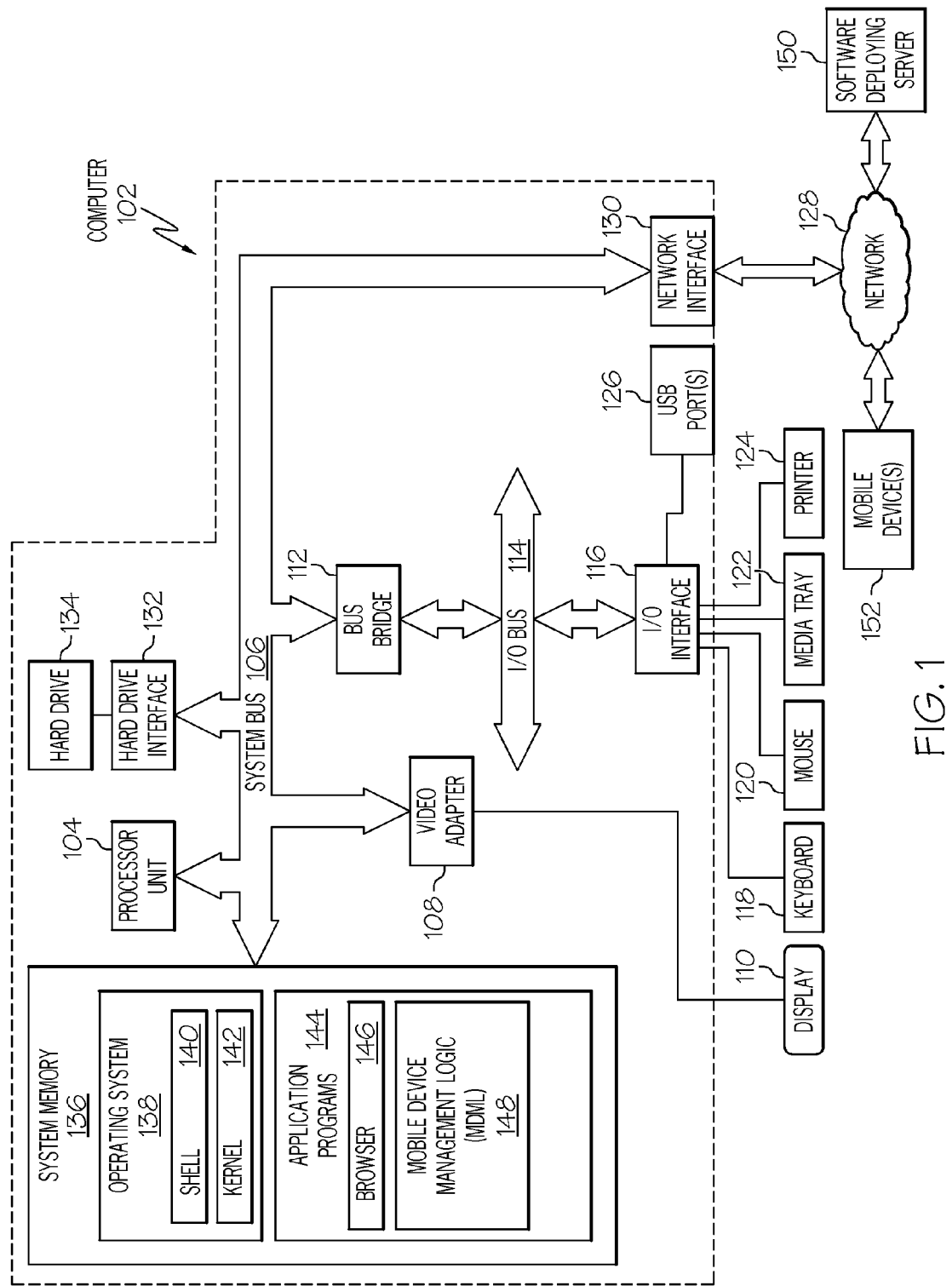
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and mobile device(s) 152, as well as the telecommunications server 202 and/or telecommunications client device 252 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as mobile device(s) 152 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Mobile Device Management Logic (MDML) 148. MDML 148 includes code for implementing the processes described below, including those described in FIGS. 2-4. In one embodiment, computer 102 is able to download MDML 148 from software deploying server 150, including in an on-demand basis, wherein the code in MDML 148 is not downloaded until needed for execution. Note further that, in one embodiment of the present invention, software deploying server 150 performs all of the functions associated with the present invention (including execution of MDML 148), thus freeing computer 102 from having to use its own internal computing resources to execute MDML 148.

Also coupled to computer 102 via network 128 are mobile device(s) 152, which may be laptop computers, tablet computers, etc. However, in one embodiment, one or more of the mobile device(s) 152 are "smart phones", which are cellular phones that are capable of downloading, creating, and/or executing mobile applications.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
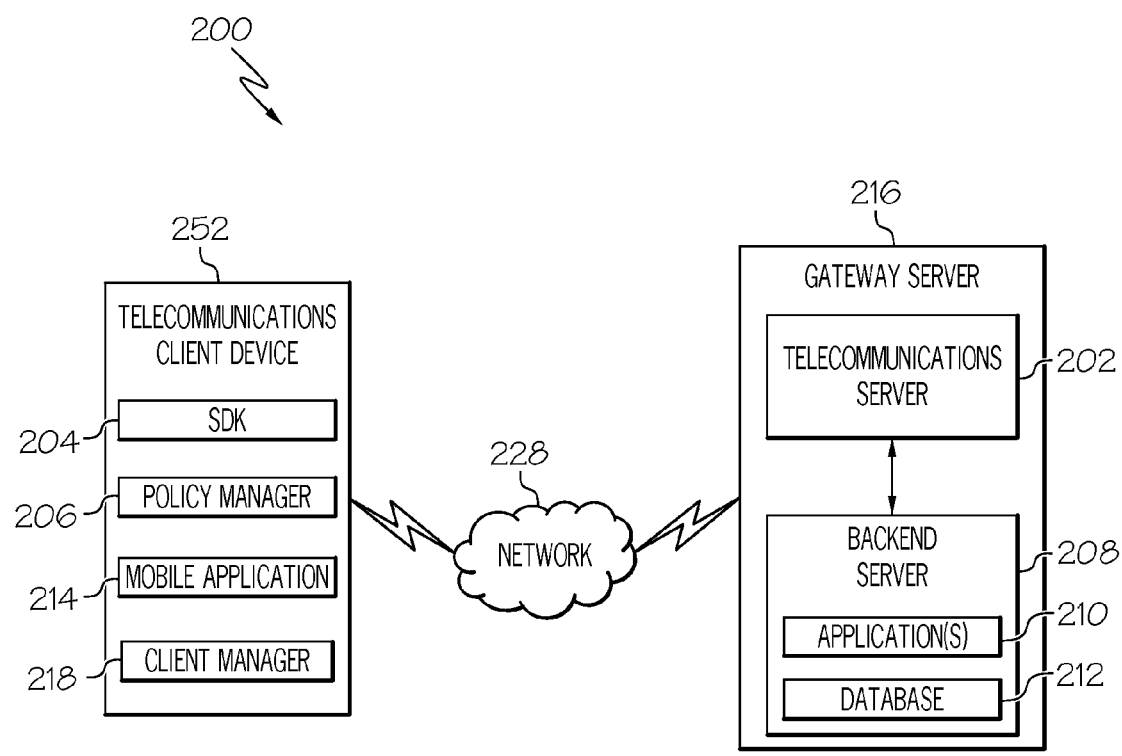
FIG. 2 illustrates an exemplary system in which a mobile device is able to download a blob of data from a server according to one embodiment of the present invention.

With reference now to FIG. 2, an exemplary system 200 in which a mobile device is able to download a blob of data from a server according to one embodiment of the present invention is presented. A blob of data is also simply known as a "blob", which is an acronym for a "binary/basic large object", and which is a collection of binary data. As depicted, a telecommunications client device 252 (such as a "smart phone", and analogous to one of the mobile device(s) 152 shown in FIG. 1), is coupled to a telecommunications server 202 (analogous to the computer 102 shown in FIG. 1) via a cellular/mobile network 228 (analogous to network 128 shown in FIG. 1). As depicted, the telecommunications server 202 is able to supply applications and/or data from a backend server 208.

Note that in one embodiment, there only one type of network 228 is initially available to the telecommunications client device 252. Since there is only one type of network 228 that is initially available to the telecommunications client device 252, the telecommunications client device 252 must adapt its operations (including how it downloads applications/data) to that type of network 228, since there are no other types of networks that are initially available to the telecommunications client device 252. If another type of network 228 later becomes available to the telecommunications client device 252, then that other type of network 228 is the only available type of network available to telecommunications client device 252. That is, telecommunications client device 252 is unable to pick and choose an optimal type of network for downloading applications/data, since the type of network 228 available to the telecommunications client device 252 is imposed upon the telecommunications client device 252 due to the availability of only one type of network. Thus, the telecommunications client device 252 has no choice in what type of network 228 is used, since this is dictated by the availability of only a single network 228 and no other network or type of network.

Assume now for illustrative purposes that the telecommunications client device 252 is running an optimized Software Development Kit (SDK), such as SDK 204, which is a set of software development tools that allows the telecommunications client device 252 to dynamically download and/or create applications to run on telecommunications client device 252. Assume further that the telecommunications server 202 is a server that, using a cellular network such as network 228, is able to connect the telecommunications client device 252 to other cell phones, as well as client devices and servers on the Internet, such as backend server 208. Backend server 208 is able to supply application(s) 210 and/or data 212 to requesting devices, such as the telecommunications client device 252, via the telecommunications server 202.

For example, assume that the SDK 204 in telecommunications client device 252 needs a required application (from application(s) 210) and/or supporting data (from database 212) to build a mobile application 214. Mobile application 214 uses an optimized SDK 204 on the client side to connect to the backend server 208 via a mobile Gateway, which utilizes a gateway server 216 (e.g., made up of telecommunications server 202 and backend server 208) and network 228.

Assume now that the telecommunications client device 252 makes a request to download a blob. (A "blob" is a "binary/basic large object", which is a collection of binary data that, in one embodiment, is stored as a single entity in a database). This request starts the policy manager 206, which manages how blobs are downloaded to the telecommunications client device 252.

The policy manager 206 first queries the backend server 208 for the size of the download that will be required to download the requested application (from application(s) 210) and/or data (from database 212).

The gateway server 216 (i.e., telecommunications server 202 plus backend server 208) responds with two options for the requested download: compressed and uncompressed. That is, the gateway server 216 offers the requested blob in either a compressed version or an uncompressed version.

The client-side SDK-based policy manager 206 then checks/determines what the network type for network 228 is. Network 228 may be a cellular network, such as a 2G/3G/4G cellular network, or it may be a Wireless Local Area Network (WLAN), such as a WLAN that conforms with Institute of Electrical and Electronics Engineers' (IEEE) 802.11 standards (commonly referred to as a "Wi-Fi network"). Accordingly, the policy manager 206 computes an optimal chunk size (CS) along with number of chunks (e.g., 5 k chunks×20 for a 100 k file) for both compressed and uncompressed. That is, the policy manager 206 establishes what the optimal chunk size will be to download the needed application/data based on 1) the maximum chunk size that can be handled by the network 228; 2) how long it will take the telecommunications client device 252 to intake a single chunk; and 3) how large the requested download (application and/or data) is. In one embodiment, the initial chunk size for a given network is derived from empirical research.

If the uncompressed file size of the requested download is below a threshold ($THR_{us}$), then the policy manager 206 sets an optimal timeout $TIME_{optu}$ for uncompressed files based on the network type of network 228, the telecommunications device 252, and the size/type of file being downloaded. This timeout $TIME_{optu}$ is equal to "$TIME_{ut}+TIME_x$", where $TIME_{ut}$ is the average timeout time for downloading uncompressed to the telecommunications client device 252 (and of a particular type of data, in one embodiment), and $TIME_x$ is an extra amount of time for avoiding unnecessary timeouts. For example, if an initial timeout is 30 seconds and the last five chunks have been downloaded in an average of 4 seconds, it makes sense to fail faster when there is a network failure. The new timeout will be 9 seconds ("$TIME_{ut}+TIME_x$"=4 seconds+5=9), where the extra 5 seconds is to prevent failure of chunks that get downloaded in just over 4 seconds (e.g., 4.2 seconds). The policy manager 206 re-evaluates and fine tunes the timeout length after a download of each chunk is complete (whether it ends in success or failure). In the case of success, it implies the existing timeout value is sufficient and therefore fine tunes it to the average of the last five download times. In the case of failure, it implies the existing timeout value is insufficient and therefore upwardly adjusts $TIME_{optu}$. The extra $TIME_x$ (e.g. "5") is added so that unnecessary failures can be avoided.

In one embodiment, $TIME_x$ (e.g., 5 seconds) is empirically chosen, but can be tweaked to be a fixed interval that is the average download time $TIME_{ut}$. For example, if an initial timeout is 30 seconds and the last five chunks have been downloaded in an average of 4 seconds, then $TIME_{optu}$ is tweaked to become 4 seconds by setting $TIME_x$ to zero, and, such that ("$TIME_{ut}+TIME_x$"=4 seconds+0=4). If the time to download a future blob exceeds 4 seconds, then in one embodiment an alarm is transmitted indicating an anomaly in the download time (i.e., the current download took longer than normal). In one embodiment, this alarm results in a failure of the download (i.e., what has been downloaded is discarded, and an error is reported), while in another embodiment the download is allowed to continue to completion.

In one embodiment, $TIME_{optu}$ is tweaked by making $TIME_x$ a percentage of the average download time $TIME_{ut}$. For example, if an initial timeout is 30 seconds and the last five chunks have been downloaded in an average of 4 seconds, then $TIME_x$ is set as a percentage of $TIME_{ut}$. In various embodiments, this percentage is greater than or less than unity (1.0), and/or a positive or negative value. For example, in one embodiment, the user may want the system to issue an alarm/alert if the download takes 75% of the average download time $TIME_{ut}$ (i.e., is 25% less than $TIME_{ut}$). In this case, $TIME_x$ will be a negative value, and the new optimal timeout $TIME_{optu}$ will be 3 seconds ("$TIME_{ut}+(-TIME_x)$"=4 seconds−(0.25×4)=4−1=3). In another embodiment, the user may want the system to issue an alarm/alert if the safety margin ($TIME_x$) (in this scenario, 25% of $TIME_{ut}$), is exceeded. In this case, the new optimal timeout $TIME_{optu}$ will be 5 seconds ("$TIME_{ut}+TIME_x$"=4 seconds+(0.25×4)=4+1=5).

In one or more embodiments of the present invention, if $TIME_{optu}$ is less than the amount of time that the gateway server 216 and (singular currently available) network 228 have historically needed to download a chunk of data to the telecommunications client device 252, then the telecommunications client device 252 requests the gateway server 216 to send the uncompressed file. However, if the amount of time to download the requested applications/data is above $TIME_{ut}$, then the telecommunications client device 252 determines whether a compressed version of the file can be downloaded within a timeout length of time set for compressed file downloads ($TIME_{optc}$). $TIME_{optc}$ is determined using a similar process as that just described for calculating $TIME_{optu}$.

If the compressed size of the download is below a compressed size threshold ($THR_{cs}$), then the policy manager 206 computes the time it takes to download the compressed file, sets the client timeout to $TIME_{optc}$, and requests the gateway server 216 to send the compressed file to the telecommunications client device 252. However, if the compressed file is above ($THR_{cs}$), thus causing $TIME_{opt}$ to be too long, then the policy manager 206 starts a chunking policy.

Chunking is defined as breaking up (partitioning) a blob of data into smaller (in one embodiment uniformly sized) chunks of data. These chunks are then transmitted/downloaded to a client/receiving device, such as a "smart" cellular phone.

Based on the network type of network 228, the policy manager 206 computes an optimal chunk size $CH_{opt}$. $CH_{opt}$ is an optimal chunk size for downloading a chunk from a requested application/data based on 1) the maximum chunk size that can be handled by the network 228; 2) how long it will take the telecommunications client device 252 to receive (e.g., put into an I/O buffer, move into system memory, load into a local cache/storage device, etc.) a single chunk; and 3) how large the requested download (application and/or data) is.

The policy manager 204 then computes the time it takes to download each chunk ($TIME_{ch}$) and sets the client timeout $TIMEOUT_{ch}$ as $TIME_{ch}+T_{chx}$, where $T_{chx}$ is reserve/extra time similar to $T_x$ described above. The policy manager 206 then requests the gateway server 216 to send how many chunks will be required to send the requested blob of data (i.e., an application or a set of data), where each chunk has the chunk size $CH_{opt}$. After receiving the total number of chunks that will be sent, the policy manager 206 then requests the gateway server 216 to start sending the data in chunks.

While downloading the chunks, if network 228 changes to a different network of a different type (e.g., from a slow 2G cellular network to a relatively faster 801.xx WLAN or vice versa), the policy manager 206, under the direction of a client manger 218 that has been notified of the network change, recomputes the chunk size (using the process described above), and establishes a new session (using handshakes, etc.) with the gateway server 216 in order to request the file download. If the network change occurs in the middle of the file download, then the client manager 218 caches already downloaded chunks from the first network, so that upon reconnecting to the second network the client manager 218 needs only to request the remaining chunks in the blob (application/data being downloaded).

Figure 3:
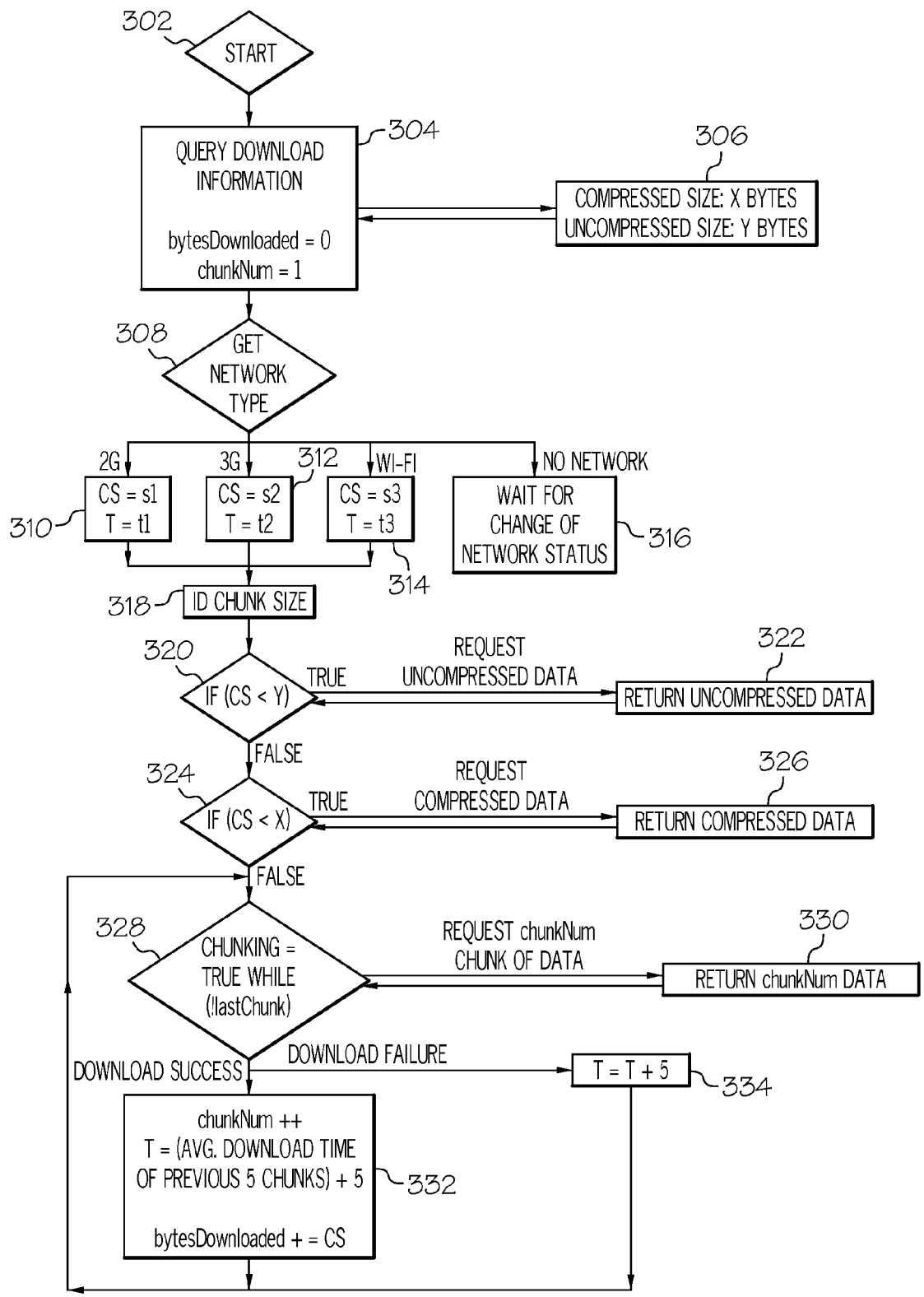
FIG. 3 is a high level flow chart of one or more steps performed by one or more processors to download a blob of data from a server to a mobile device.

FIG. 3 is a high level flow chart of one or more steps performed by one or more processors to download a blob of data from a server to a mobile device. After initiator block 302, which may be prompted by a mobile device (e.g., a cell phone) determining a need to download a blob of data, the mobile device queries a gateway server for download information about the blob (block 304). The gateway server then responds (block 306) with the size of the blob, including the size of both the compressed (X bytes) and uncompressed (Y bytes) versions. The client manager then determines what type of network is available (block 308). Note that while three networks are depicted in FIG. 3 (2G network 310, 3G network 312, and Wi-Fi (801.xx) network 314), as well as the possibility that there is no network available at all (block 316), note that only one, if any, network is available to the client device (e.g., smart phone). That is, either one (and only one) of the networks shown as elements 310, 312, 314 is available to the client device or else no network is available (block 316). More specifically, the client device (smart phone) is unable to select from the networks depicted as elements 310, 312, 314, since only one of these networks is available, due to technical limitations of the client device/smart phone, the client device/smart phone only being within range of one of the networks depicted, etc. Thus, if the client device/smart phone were to elect to disconnect from the 2G network 310, then the client device/smart phone would not be able to then connect to the 3G network 312 or the Wi-Fi network 314, since they are not available to the client device/smart phone at the time that the client device/smart phone elected to disconnect from the 2G network 310.

Once the one and only network that is available to the client device/smart phone is identified, an optimal chunk size for that network/phone/blob is calculated (block 318). If the blob requested is less than this optimal chunk size in its uncompressed form (query block 320), then the uncompressed blob is retrieved from the backend server and downloaded to the client device/smart phone (block 322). That is, if the uncompressed blob can be downloaded in a single session (determined by the timeout on the client device/smart phone and/or the bandwidth of the present network and the gateway server), then the uncompressed blob is downloaded to the client device/smart phone.

However, if the uncompressed blob is too large to be downloaded in a single session, a determination is made as to whether the compressed version of the blob is small enough to do so (query block 324). If so, then the compressed version of the blob is retrieved from the backend server and downloaded to the client device/smart phone (block 326).

If the compressed blob is still too large, then the blob is divided into chunks by the gateway server (block 328). The gateway server determines the optimal chunk size and how many optimal chunks will be required to download the requested blob (block 330). The chunks of data then start downloading to the client device/smart phone (block 328). If the entire blob successfully downloads, then the timeout length of time for downloading such chunks is tweaked (block 332). For example, if the timeout for downloading a chunk was 10 seconds, but each of the chunks in the blob was able to download in less than 4 seconds, then the average time T is 4. In order to give the system some leeway (and thus avoid unnecessary timeouts), an extra amount of time (e.g., "5 seconds", as depicted in block 334), is added to T, thus making the new timeout time "9 seconds" before the client device/cell phone will stop downloading a particular block of data.

Figure 4:
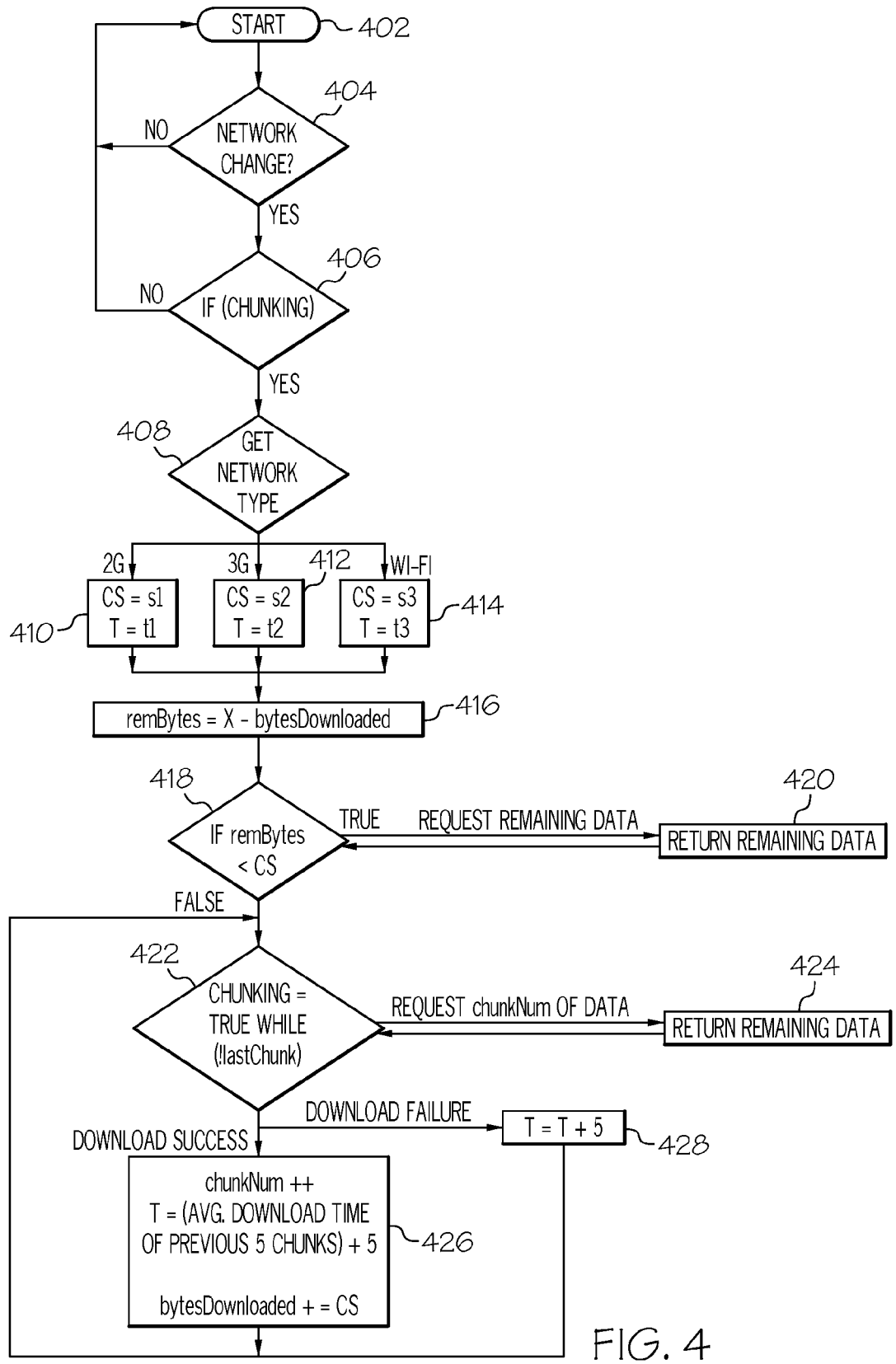
FIG. 4 is a high level flow chart of one or more steps performed by one or more processors for reacting to a change in networks between a server and a mobile device to which a blob of data is being transmitted.

In some scenarios, a new network will be forced upon the client device/smart phone before the entire blob is downloaded. FIG. 4 is a high level flow chart of one or more steps performed by one or more processors for reacting to such a change in networks between a server and a mobile device to which a blob of data is being transmitted. After initiator block 402, a query is made as to whether or not there has been a network change foisted upon the client device/smart phone (query block 404). If so, then a determination is made as to whether chunking is being implemented to download the requested blob (even if there is only one chunk—i.e., a single compressed/uncompressed chunk of data), as described in block 406.

If chunking is going on, then the system determines the type of the replacement network, if any (block 408). Assuming that the new network is of a different type than that of the network being replaced, the system identifies the new network as coming from one of the networks depicted for exemplary purposes as 2G network 410, 3G network 412, or Wi-Fi network 414.

The client manager in the client device/smart phone has been keep a record of how many chunks of data were downloaded using the initial network. Thus, the client manager knows the identity of and the quantity of remaining chunks of data to be downloaded (block 416). If the chunk size of the initial network is the same or less than the chunk size used by the new network (block 418), then the remaining chunks are retrieved from the backend server (block 420). However, if the new network uses smaller chunk sizes (query block 418), then the system recalculates the number of chunks needed to download the rest of the blob (block 422) and retrieves the newly-sized chunks from the backend server (block 424).

As with the process described in FIG. 3, the system then tweaks the optimal chunk size for the replacement network, as depicted in block 426, including the addition of a reserve/extra amount of time in order to avoid unnecessary timeouts (block 428).

Thus, in one embodiment of the present invention, a novel method for downloading a blob of data onto a mobile device (e.g., a "smart" phone) is presented. As described in block 308 of FIG. 3, a first network is identified by a system, such as a mobile device (e.g., telecommunications client device 252 shown in FIG. 2) or one or more components of a server (e.g., gateway server 216 shown in FIG. 2).

As described in block 304 of FIG. 3, the system further identifies a blob of data that is to be downloaded from the server to the mobile device. As described in blocks 310, 312, and/or 314 of FIG. 3, a first maximum chunk size for the first network is identified. The first maximum chunk size is a maximum amount of data that can be transmitted via the first network in a single session. A single session is defined as a synchronous and uninterrupted exchange of data between the mobile device and the server.

As described in block 332 in FIG. 3, a first timeout value for a first timeout is then calculated/determined/identified. The first timeout value is based on an expected amount of time required by the mobile device to receive a first chunk of data via the first network. The first chunk of data is of the first maximum chunk size for the first network. Thus, the timeout will cause the mobile device to stop receiving the first chunk of data via the first network if the first chunk of data is not completely received by the mobile device within the expected amount of time.

As described in block 318 in FIG. 3, a first optimal chunk size for chunking the blob of data is then determined/calculated/identified based on the first timeout value of the mobile device and the first maximum chunk size for the first network. As described in block 328 of FIG. 3, the blob of data is then partitioned into chunks of data based on the first optimal chunk size. As described in block 328 in FIG. 3, the chunks of data, in the first optimal chunk size, are then transmitted from the server to the mobile device.

As described in block 308 of FIG. 3, in one embodiment of the present invention the first network is an only network that is presently offered to and available to the mobile device. That is, the mobile device is incapable of selecting another network, since only the first network is initially available to the mobile device.

As described in block 404 of FIG. 4, in one embodiment of the present invention the method further comprises detecting that the first network is replaced by a second network, wherein the second network is now the only network that is presently offered to and available to the mobile device. That is, initially only the first network was available to the mobile device. Now however, the first network is no longer available, and only the second network is available to the mobile device. In response to detecting that the first network has been replaced by the second network, the following events occur. As described in blocks 408, 410, 412, and 414 of FIG. 4, a second maximum chunk size for the second network is identified by the system. This second maximum chunk size is a maximum amount of data that can be transmitted via the second network in a single session. As described in block 426 of FIG. 4, the system determines a second timeout value for a second timeout. This second timeout value is based on an expected amount of time required by the mobile device to receive a second chunk of data via the second network. The second chunk of data is of the second maximum chunk size for the second network. Thus, the second timeout will cause the mobile device to stop receiving the second chunk of data via the second network if the second chunk of data is not completely received by the mobile device within the expected amount of time. As described in block 416 of FIG. 4, the system then calculates/determines a second optimal chunk size for the blob of data based on the second timeout value of the mobile device and the second maximum chunk size for the second network. As described in block 422 of FIG. 4, the system then partitions the blob of data (either the entire blob or the remaining portion of the blob that was not already transmitted using the first network) into chunks of data based on the second optimal chunk size, and transmits the (remaining) chunks of data from the server to the mobile device using the second optimal chunk size (see block 426 of FIG. 4).

In one embodiment of the present invention, the method further comprises identifying how many chunks of data in the first chunk size were received by the mobile device via the first network (see block 406 in FIG. 4), and then transmitting any remaining data from the blob in the second chunk size via the second network (see block 422 in FIG. 4).

In one embodiment of the present invention, the blob of data is an uncompressed blob. In a further embodiment in which the blob of data is uncompressed, the method further comprises determining a size of the uncompressed blob (see block 320 in FIG. 3), and then, in response to determining that the size of the uncompressed blob is less than the first maximum chunk size for the first network, ceasing transmission of the chunks of data and transmitting the uncompressed blob of data from the server to the mobile device (see block 322 in FIG. 3).

In one embodiment of the present invention, the blob of data is a compressed blob. In a further embodiment in which the blob of data is compressed, the method further comprises determining a size of the compressed blob (see block 328 in FIG. 3). Thereafter, in response to determining that the size of the compressed blob is less than the first maximum chunk size for the first network, the system ceases transmission of the chunks of data and transmits the compressed blob of data from the server to the mobile device (see block 330 in FIG. 3).

As described herein, while the client/mobile device may be one of many different types of client/mobile devices, in one embodiment the mobile device is a cellular phone, such as a "smart" phone that is able to download/generate/execute software applications thereon.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for downloading a blob of data onto a mobile device, the computer program product comprising a computer readable storage medium having program code embodied therewith, the program code readable and executable by a processor to perform a method comprising:
   identifying a first network;
   identifying a blob of data that is to be downloaded from a server to a mobile device that are operating on the first network;
   identifying a first maximum chunk size for the first network, wherein the first maximum chunk size is a maximum amount of data that can be transmitted via the first network in a single session;
   determining a first timeout value for a first timeout, wherein the first timeout value is based on an expected amount of time required by the mobile device to receive a first chunk of data via the first network after transmission of the first chunk of data has begun, wherein the first chunk of data is of the first maximum chunk size for the first network, and wherein the first timeout will cause the mobile device to stop receiving the first chunk of data via the first network if the first chunk of data is not completely received by the mobile device within the expected amount of time;
   determining a first optimal chunk size for chunking the blob of data based on the first timeout value of the mobile device and the first maximum chunk size for the first network;
   partitioning the blob of data into chunks of data based on the first optimal chunk size;
   transmitting the chunks of data from the server to the mobile device;
   determining that an uncompressed file size of the blob of data is below a threshold $THR_{us}$; and
   in response to determining that the uncompressed file size of the blob of data is below the threshold $THR_{us}$, setting the first timeout value as an optimal timeout $TIME_{optu}$ for uncompressed files based on a network type of the first network, wherein the optimal timeout $TIME_{optu}$ is equal to "$TIME_{ut}+TIME_x$", wherein $TIME_{ut}$ is an average time required to download uncompressed data to the mobile device, and wherein $TIME_x$ is an extra amount of time that is set to avoid unnecessary timeouts.

2. The computer program product of claim 1, wherein the first network is an only network that is presently offered to and available to the mobile device.

3. The computer program product of claim 2, wherein the method further comprises:
   detecting that the first network is replaced by a second network, wherein the second network is now the only network that is presently offered to and available to the mobile device; and
   in response to detecting that the first network has been replaced by the second network:
      identifying a second maximum chunk size for the second network, wherein the second maximum chunk size is a maximum amount of data that can be transmitted via the second network in a single session;
      determining a second timeout value for a second timeout, wherein the second timeout value is based on an expected amount of time required by the mobile device to receive a second chunk of data via the second network, wherein the second chunk of data is of the second maximum chunk size for the second network, and wherein the second timeout will cause the mobile device to stop receiving the second chunk of data via the second network if the second chunk of data is not completely received by the mobile device within the expected amount of time;

determining a second optimal chunk size for the blob of data based on the second timeout value of the mobile device and the second maximum chunk size for the second network;

partitioning the blob of data into chunks of data based on the second optimal chunk size; and transmitting the chunks of data from the server to the mobile device.

4. The computer program product of claim 3, wherein the method further comprises:

identifying how many chunks of data in the first chunk size were received by the mobile device via the first network; and transmitting any remaining data from the blob in the second chunk size via the second network.

5. The computer program product of claim 1, wherein the blob of data is an uncompressed blob, and wherein the method further comprises:

determining a size of the uncompressed blob;

in response to determining that the size of the uncompressed blob is less than the first maximum chunk size for the first network, ceasing transmission of the chunks of data and transmitting the uncompressed blob of data from the server to the mobile device.

6. The computer program product of claim 1, wherein the blob of data is a compressed blob, and wherein the method further comprises:

determining a size of the compressed blob;

in response to determining that the size of the compressed blob is less than the first maximum chunk size for the first network, ceasing transmission of the chunks of data and transmitting the compressed blob of data from the server to the mobile device.

7. The computer program product of claim 1, wherein the mobile device is a cellular phone.

8. The computer program product of claim 1, wherein $TIME_x$ is empirically chosen, and wherein the method further comprises:

adjusting $TIME_x$ based on the average time required to download uncompressed data to the mobile device.

9. The computer program product of claim 8, wherein $TIME_x$ is set to zero based on the average time required to download uncompressed data to the mobile device being less than the optimal timeout $TIME_{optu}$.

10. The computer program product of claim 1, further comprising:

setting $TIME_x$ as a percentage of the average download time based on the average download time $TIME_{ut}$.

11. The computer program product of claim 1, wherein the method further comprises:

in response to the optimal timeout $TIME_{optu}$ being above $TIME_{ut}$, determining whether a compressed version of the blob of data can be downloaded within a timeout length of time set for compressed file downloads ($TIME_{optc}$); and in response to determining that the compressed version of the blob of data can be downloaded within the timeout length of time set for compressed file downloads ($TIME_{optc}$), stopping chunking operations and transmitting the blob of data to the mobile device as a compressed file.

12. The computer program product of claim 1, wherein the method further comprises:

switching from the first network to a second network while the chunks of data are being transmitted from the server to the mobile device; and in response to switching from the first network to the second network, adjusting a sizing of the chunks of data according to a speed of the second network to be used in a new session between the server and the mobile device.

13. The computer program product of claim 12, wherein the switching from the first network to the second network occurs during the transmitting of the chunks of data from the server to the mobile device, wherein remaining chunks of data to be sent from the server to the mobile device are cached by the server, wherein adjusting the sizing of the chunks of data results in an adjusted chunk size, and wherein the method further comprises:

transmitting the remaining chunks of data from the server to the mobile device at the adjusted chunk size.

14. A system for downloading a blob of data onto a mobile device, the system comprising:

a processor, a computer readable memory, and a computer readable storage medium;

first program instructions to identify a first network;

second program instructions to identify a blob of data that is to be downloaded from a server to a mobile device that are operating on the first network;

third program instructions to identify a first maximum chunk size for the first network, wherein the first maximum chunk size is a maximum amount of data that can be transmitted via the first network in a single session;

fourth program instructions to determine a first timeout value for a first timeout, wherein the first timeout value is based on an expected amount of time required by the mobile device to receive a first chunk of data via the first network, wherein the first chunk of data is of the first maximum chunk size for the first network, and wherein the first timeout will cause the mobile device to stop receiving the first chunk of data via the first network if the first chunk of data is not completely received by the mobile device within the expected amount of time;

fifth program instructions to determine a first chunk size for chunking the blob of data based on the first timeout value of the mobile device and the first maximum chunk size for the first network;

sixth program instructions to partition the blob of data into chunks of data based on the first optimal chunk size; and seventh program instructions to transmit the chunks of data from the server to the mobile device;

eighth program instructions to switch from the first network to a second network while the chunks of data are being transmitted from the server to the mobile device; and ninth program instructions to, in response to switching from the first network to the second network, adjust a sizing of the chunks of data according to a speed of the second network to be used in a new session between the server and the mobile device; and wherein the first, second, third, fourth, fifth, sixth, seventh, eighth, and ninth program instructions are stored on the computer readable storage medium and executed by the processor via the computer readable memory.

15. The system of claim 14, wherein the first network is an only network that is presently offered to and available to the mobile device.

16. The system of claim 15, further comprising:
tenth program instructions to detect that the first network is replaced by a second network, wherein the second network is now the only network that is presently offered to and available to the mobile device; and
eleventh program instructions to, in response to detecting that the first network has been replaced by the second network:
identify a second maximum chunk size for the second network, wherein the second maximum chunk size is a maximum amount of data that can be transmitted via the second network in a single session;
determine a second timeout value for a second timeout, wherein the second timeout value is based on an expected amount of time required by the mobile device to receive a second chunk of data via the second network, wherein the second chunk of data is of the second maximum chunk size for the second network, and wherein the second timeout will cause the mobile device to stop receiving the second chunk of data via the second network if the second chunk of data is not completely received by the mobile device with the expected amount of time;
compute a second optimal chunk size for the blob of data based on the second timeout value of the mobile device and the second maximum chunk size for the second network;
partition the blob of data into chunks of data based on the second optimal chunk size; and
transmit the chunks of data from the server to the mobile device; and wherein
the tenth and eleventh program instructions are stored on the computer readable storage medium and executed by the processor via the computer readable memory.

17. The system of claim 16, further comprising:
twelfth program instructions to identify how many chunks of data in the first chunk size were received by the mobile device via the first network; and
thirteenth program instructions to transmit any remaining data from the blob in the second chunk size via the second network; and wherein
the twelfth and thirteenth program instructions are stored on the computer readable storage medium and executed by the processor via the computer readable memory.

18. The system of claim 14, wherein the blob of data is an uncompressed blob, and wherein the system further comprises:
tenth program instructions to determine a size of the uncompressed blob;
eleventh program instructions to, in response to determining that the size of the uncompressed blob is less than the first maximum chunk size for the first network, cease transmission of the chunks of data and transmit the uncompressed blob of data from the server to the mobile device; and wherein
the tenth and eleventh program instructions are stored on the computer readable storage medium and executed by the processor via the computer readable memory.

19. The system of claim 14, wherein the blob is data is a compressed blob, and wherein the system further comprises:
tenth program instructions to determine a size of the compressed blob;
eleventh program instructions to, in response to determining that the size of the compressed blob is less than the first maximum chunk size for the first network, cease transmission of the chunks of data and transmit the compressed blob of data from the server to the mobile device; and wherein
the tenth and eleventh program instructions are stored on the computer readable storage medium and executed by the processor via the computer readable memory.

* * * * *